United States Patent
AlShafei

(10) Patent No.: US 11,524,249 B2
(45) Date of Patent: Dec. 13, 2022

(54) CONTROLLING DEGRADATION IN A REBOILER VIA A HYDROPHOBIC COATING

(71) Applicant: Saudi Arabian Oil Company, Dhahran (SA)

(72) Inventor: Hasan M. AlShafei, Saihat (SA)

(73) Assignee: Saudi Arabian Oil Company, Dhahran (SA)

(*) Notice: Subject to any disclaimer, the term of this patent is extended or adjusted under 35 U.S.C. 154(b) by 0 days.

(21) Appl. No.: 17/194,553

(22) Filed: Mar. 8, 2021

(65) Prior Publication Data
US 2022/0280883 A1 Sep. 8, 2022

(51) Int. Cl.
*B01D 3/32* (2006.01)
*B01D 53/14* (2006.01)
*B01D 53/18* (2006.01)
*B01D 5/00* (2006.01)

(52) U.S. Cl.
CPC .......... *B01D 3/322* (2013.01); *B01D 5/0063* (2013.01); *B01D 53/1425* (2013.01); *B01D 53/1462* (2013.01); *B01D 53/1493* (2013.01); *B01D 53/18* (2013.01); *B01D 2252/20478* (2013.01)

(58) Field of Classification Search
CPC .. B01D 3/322; B01D 5/0063; B01D 53/1425; B01D 53/1462; B01D 53/1493; B01D 53/18; B01D 2252/20478
See application file for complete search history.

(56) References Cited

U.S. PATENT DOCUMENTS

| | | | | |
|---|---|---|---|---|
| 4,933,046 A | * | 6/1990 | May | B01F 1/0017 159/DIG. 42 |
| 7,531,598 B2 | * | 5/2009 | Muller | B08B 17/065 524/588 |
| 7,569,194 B2 | * | 8/2009 | Russell | F22B 1/1838 423/220 |
| 7,836,844 B2 | | 11/2010 | Golovin et al. | |
| 7,887,934 B2 | * | 2/2011 | Gentleman | C23C 14/08 427/595 |
| 7,892,660 B2 | * | 2/2011 | Gentleman | C09D 5/18 427/595 |
| 7,897,271 B2 | * | 3/2011 | Gentleman | C01F 17/235 428/312.8 |
| 7,901,798 B2 | * | 3/2011 | Gentleman | C04B 38/00 428/432 |
| 7,977,267 B2 | * | 7/2011 | Gentleman | F01D 25/02 428/701 |

(Continued)

OTHER PUBLICATIONS

Cen.acs.org [online], "Wastewater from Fracking: Gorwing Disposal Challenge or Untapped Resource," retrieved from URL <https://cen.acs.org/environment/water/Wastewater-fracking-Growing-disposal-challenge/97/i45>, Erickson, Chemical & Engineering News (C&EN), Nov. 17, 2019, 97:45, 6 pages.

(Continued)

*Primary Examiner* — Jonathan Miller
(74) *Attorney, Agent, or Firm* — Fish & Richardson P.C.

(57) ABSTRACT

A method and systems are provided for controlling degradation in a reboiler using a hydrophobic coating. A reboiler is provided that includes a steam shell and a plurality of tubes. The reboiler includes a low surface-energy coating on a surface of the plurality of tubes.

16 Claims, 5 Drawing Sheets

(56) References Cited

U.S. PATENT DOCUMENTS

| | | | |
|---|---|---|---|
| 8,080,089 B1* | 12/2011 | Wen | B01D 53/1475 95/174 |
| 8,573,303 B2 | 11/2013 | Kerfoot | |
| 2005/0016828 A1* | 1/2005 | Bednarek | B01D 3/007 203/1 |
| 2007/0028588 A1* | 2/2007 | Varanasi | F28F 13/187 165/133 |
| 2008/0009405 A1* | 1/2008 | Russell | F22B 1/1838 502/56 |
| 2010/0021692 A1* | 1/2010 | Bormashenko | B05D 1/42 427/355 |
| 2012/0285629 A1* | 11/2012 | Simpson | B01D 5/006 159/47.1 |
| 2017/0190139 A1* | 7/2017 | Haghdoost | C25D 5/617 |
| 2021/0278144 A1* | 9/2021 | Blokhin | F28F 13/182 |

OTHER PUBLICATIONS

Curran, "Solving Heat Exchanger Tube Problems with Thin Film Thermally Conductive Coating Applications and Novel Tube and Pipe Cleaning as a Precursor to Coating Application and NDT: Best Maintenance Practice Extends the Life of Heat Exchanger Tubes Indefinitely, Eliminate Scaling Deposition Solves Aggressive Erosion and Corrosion Problems, and Maintains Optimum Heat Rates," proceedings of International Conference on Heat Exchanger Fouling and Cleaning VIII, Schladming, Austria, Jun. 14-19, 2009, 6 pages.

Curranintl.com [online], "Heat Exchanger Release & Protective Coatings," Curran International Tubular Heat Transfer Equipment Services, retrieved from URL <http://www.curranintl.com/heat-exchanger-protective-coating>, Nov. 18, 2020, 10 pages.

Gawlik et al., "Field Testing of Heat Exchanger Tube Coatings," NREL/CP-550-26210, National Renewable Energy Laboratory (NREL), Nov. 1998, Geothermal Resources Council 1998, Annual Meeting, San Diego, California, Sep. 20-23, 1998, 12 pages.

Hatchell et al., "Thermal degradation of linear amines for CO2 capture." Energy Procedia 63, Jan. 2014, 1558-1568, 11 pages.

Hcpetroleum.hk [online], "Oilfield Service Company," retrieved from URL <https://www.hcpetroleum.hk/news-detail/175>, Dec. 10, 2020, 4 pages.

Lavrikov et al., "Thermosiphon Reboilers with Ehanced Tubes," Communication, Chemie Ingenieur Technik, 2015, 87:3 (290-296), 7 pages.

Polystarcontainment.com [online], Hydraulic Frac Tank Spill Prevention, retrieved from URL <https://www.polystarcontainment.com/industry/hydraulic-fracturing/>, Dec. 2020, 6 pages.

* cited by examiner

CONTROLLING DEGRADATION IN A REBOILER VIA A HYDROPHOBIC COATING

TECHNICAL FIELD

The present disclosure is directed to amine sweetening processes.

BACKGROUND

Gas Plants produce hydrocarbons, such as sales gas, and NGL to supply industrial sectors with power. However, natural gases carry acids, namely H2S, CO2, and COS, which hinder the production and separation of hydrocarbons. For example, the acid gases cause corrosion, and contaminate product streams. Amines, such as alkanolamine solutions are used as absorbance for the removal of acid gas as they are characterized with physical and chemical attributes to effectively absorb acid gas. However, the alkanolamine solutions can be thermally degraded in steam reboilers at high shell temperatures. These degradation products account as solvent losses and operational costs.

SUMMARY

An exemplary embodiment described herein provides a reboiler that includes a steam shell and a plurality of tubes. The reboiler includes a low surface-energy coating on a surface of the plurality of tubes.

Another exemplary embodiment described herein provides a method for controlling degradation of a compound in a reboiler. The method includes selecting a low surface-energy coating, applying the low surface-energy coating to a surface of a tube in the reboiler that is in contact with the compound, and placing the reboiler in service.

Another exemplary embodiment described herein provides an amine stripper. The amine stripper includes a vessel including a rich solvent inlet and a lean solvent outlet, and a reboiler. The reboiler includes a steam shell, a plurality of tubes, and a low surface-energy coating on a surface of the plurality of tubes.

DETAILED DESCRIPTION

Techniques are provided herein to reduce shell temperature by increasing nucleate heat transfer coefficient. As described in examples herein, hydrophobic materials are deposited along tubing surfaces that are in direct contact with alkanolamine solvents. The hydrophobic coating layer may minimize degradation of the alkanolamine solvents, and thus minimize solvent losses, reduce steam consumption, and enhance process integrity.

Figure 1:
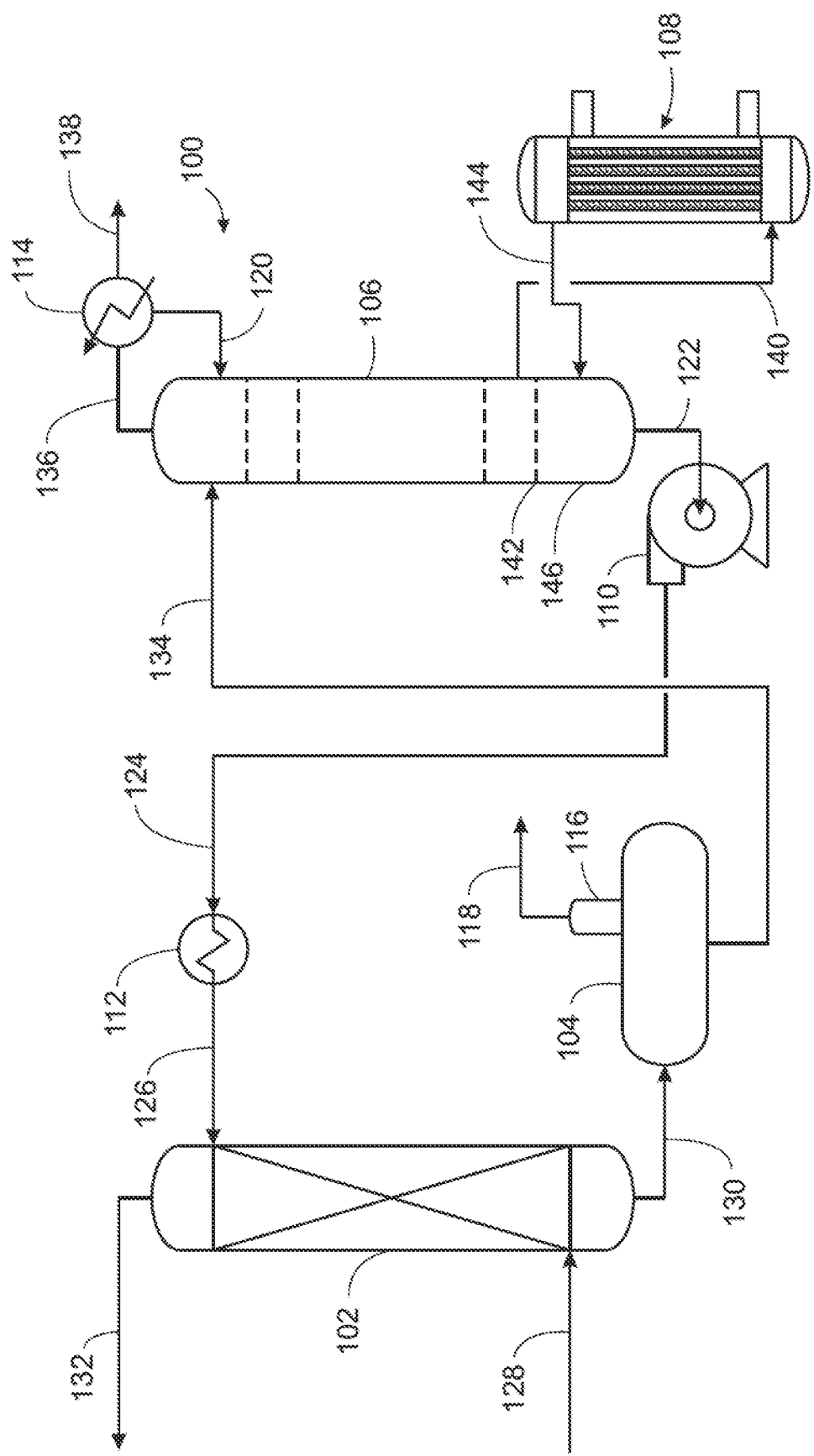
FIG. 1 is a schematic diagram of a sweetening system.

FIG. 1 is a schematic diagram of a sweetening system 100. The sweetening system 100 includes an amine contactor 102, a flash drum 104, an amine stripper 106, and a reboiler 108 on the amine stripper 106. Further units that can be used in the system include an amine circulation pump 110, an amine cooler 112, and a reflux chiller 114 on the amine stripper 106. As used herein, amine includes alkanolamine solvents, or other types of amine solvents that may be used for the absorption of acid gases in a sweetening system 100.

The amine contactor 102 is a counter-flow gas-liquid contactor that can be referred as an absorber, treater, or scrubber. The amine contactor generally includes internal components, such as trays or packing, to increase gas-liquid contact.

The flash drum 104 operates at a lower pressure than the amine contactor 102 and allows light hydrocarbons to flash or evaporate from the amine solvent. The flash drum 104 is sized for liquid surge, liquid holdup, and residence time for vapor to separate from the liquid amine solvent. In some embodiments, the flash drum 104 is equipped with a flash drum tower 116. The flash drum tower 116 can remove acid gas such as hydrogen sulfide, which can be present in the vapor stream 118 separated from the amine solvent, before the vapor stream 118 is sent to another downstream process or end user.

The amine stripper 106 is a vessel, which can also be referred to as a regenerator. The amine stripper 106 comprises internal components, for example, trays or packing, and effectively serves as a distillation tower to boil off acid gas to regenerate the amine solvent. In some embodiments, the amine stripper 106 includes a reflux chiller 114 to cool a flow from the top of the amine stripper 106, and return condensate to the amine stripper 106 as a reflux stream 120. The distinction between acid gas and sour gas is that sour gas is mostly hydrocarbons with some acidic gas content, and acid gas contains little to no hydrocarbons.

The circulation pump 110 pressurizes the regenerated amine, e.g., the lean solvent stream 122, to recycle back to the amine contactor 102 as a pressurized stream 124. The circulation pump 110 can comprise a single pump or multiple pumps in parallel or in series. The circulation pump 110 can be sized to accommodate upset scenarios, which require much higher flow rates than is normally required by the sweetening system 100.

The amine cooler 112 brings the temperature of the pressurized stream 124 down before the cooled solvent stream 126 is recycled back to the amine contactor 102. The lower temperature of the solvent stream 126 increases the efficiency of cleaning the sour gas stream 128 that enters the amine contactor 102. The amine cooler 112 can be a shell-and-tube heat exchanger, an air cooler, or a combination of multiples of both.

Gas sweetening units can optionally comprise auxiliary and variant equipment such as additional heat exchangers and vessels that have not been described above, but a majority of gas sweetening units across the world implement some variation or combination of the major equipment outlined.

The sweetening system 100 can operate at a variety of operating temperatures and pressures. In some embodiments, sour gas at a temperature of between about 70 and about 130° F. enters the bottom of the amine contactor 102 via sour gas stream 128, as the amine solvent stream 126 enters from the top of the amine contactor 102 at a temperature of between about 80 and about 140° F. The amine solvent stream 126 that enters the amine contactor 102 is at least about 10° F. hotter than the sour gas stream 128 that enters the amine contactor 102. As the amine solvent contacts the sour gas, the solvent absorbs the sulfur compounds, carbon dioxide, and other contaminants from the sour gas, by chemical and physical binding.

Once the solvent has passed through amine contactor 102, a rich solvent stream 130 exiting the amine contactor 102 is considered to be in a "rich" state, also referred as "rich solvent", because the solvent contains the acid gases removed from the sour gas. A sweetened gas stream 132 exits from the top of the amine contactor 102. The sweetened gas can contain about 5 ppm to about 60 ppm hydrogen sulfide. The sweetened gas is sent downstream for sale or further processing. The rich solvent stream 130 is sent to the flash drum 104, which operates at a pressure between about atmospheric pressure to about 90 psig, where any flashed vapor travels up the flash drum tower 116 and exits as the vapor stream 118, where the flashed vapor can then be utilized as fuel, vented, flared, or a combination of these.

The rich solvent stream 134 from the flash drum 104 is sent to the amine stripper 106 with a top operating pressure between 5 and about 17 psig. The hydrogen sulfide and carbon dioxide is boiled off via heat input to the bottom of stripper 106 by the reboiler 108. The reboiler operates at a temperature range of between about 230 to about 270° F. in order to regenerate the amine solvent. The regenerated solvent is then considered to be in a "lean" state, also referred as "lean solvent," that is once again suitable to be used for cleaning additional sour gas.

A mixed gas stream 136, comprising some hydrocarbons, hydrogen sulfide, and carbon dioxide exits the top of the stripper 106. The mixed gas stream 136 passes through the reflux chiller 114, and the reflux stream 120, including hydrocarbons condensed in the reflux chiller 114, is returned to the stripper 106. An acid gas stream 138, including hydrogen sulfide and carbon dioxide, exits the reflux chiller 114 to be passed to downstream processes, or waste.

The lean solvent stream 122 that is pumped out of the bottom of the stripper 106 by the circulation pump 110 is cooled in an amine cooler 112 to about 80 to about 140° F. before re-entering the amine contactor 102 to be used again to clean additional sour gas. The transport of vapor and liquid within, to, and from the sweetening system 100 can be achieved using various piping, pump, and valve configurations.

In this example, if the reboiler 108 is considered a single-pass reboiler, in which the feed stream 140 into the reboiler 108 is taken from above one of the plates 142 in the stripper 106. The heated return stream 144 is fed to the bottoms 146 of the stripper 106. The reboiler 108 is described further with respect to FIG. 2.

Figure 2:
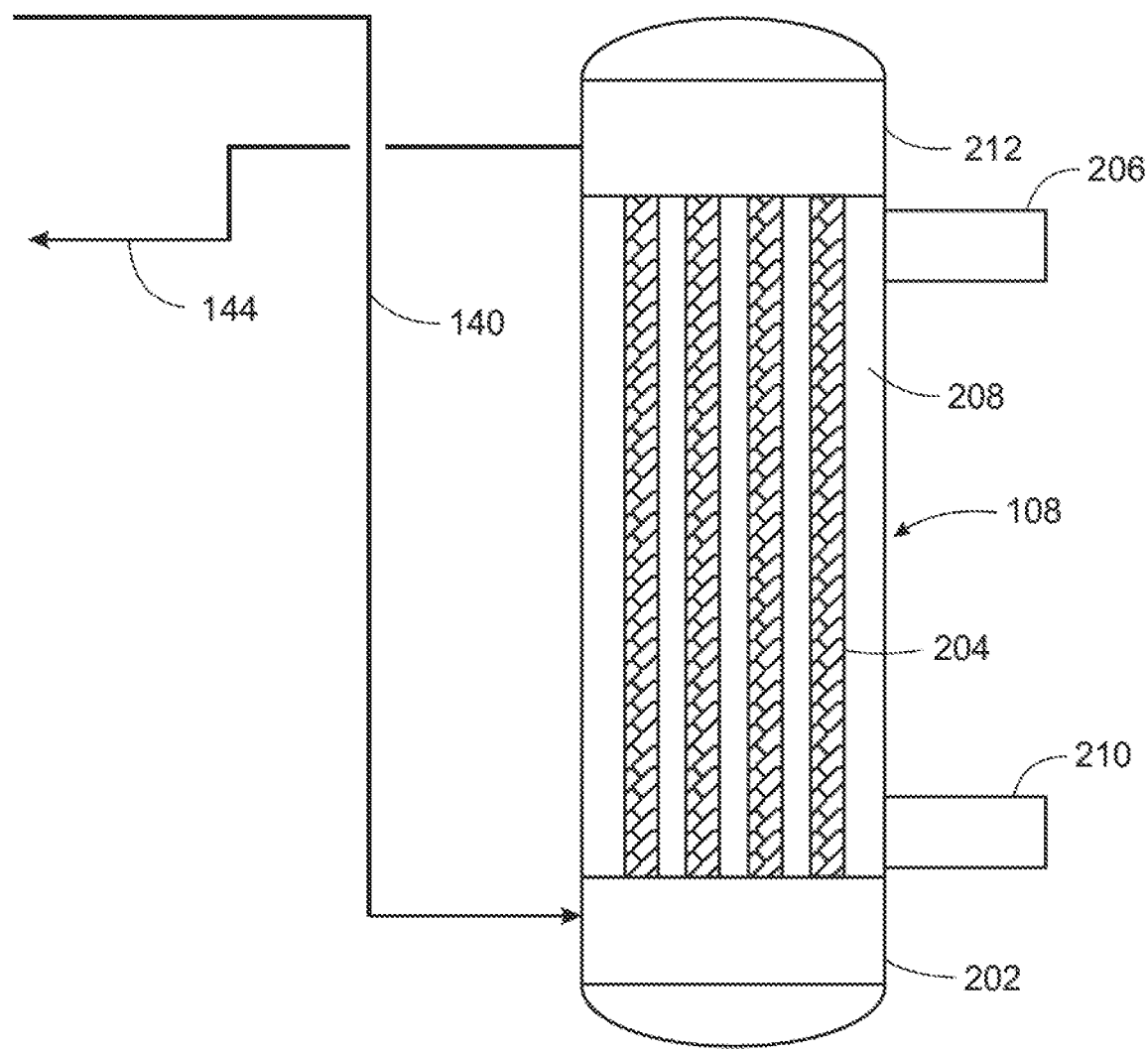
FIG. 2 is a schematic drawing of a reboiler used in a sweetening system.

FIG. 2 is a schematic drawing of a reboiler 108 used in a sweetening system. Like numbered items are as described with respect to FIG. 1. As shown in FIG. 1, the acid gases flashed off the amine solvent, or alkanolamine solution, by a stripping vapor, mostly steam, generated in the reboiler 108. In the reboiler 108, the feed stream 140 enters a bottom chamber 202. From the bottom chamber 202, the amine solvent flows upwards through the tubes 204 of the reboiler 108. Steam is introduced into the reboiler through a steam inlet line 206 and flows through the space 208 around the tubes 204, heating the tubes 204 and the amine solvent in the tubes 204. The steam then exits the reboiler through a steam outlet line 210. Although the steam inlet line 206 and the steam outlet line 210 may be reversed, generally the steam is introduced at the top of the heated vessel to force condensate from the steam out.

Figure 3:
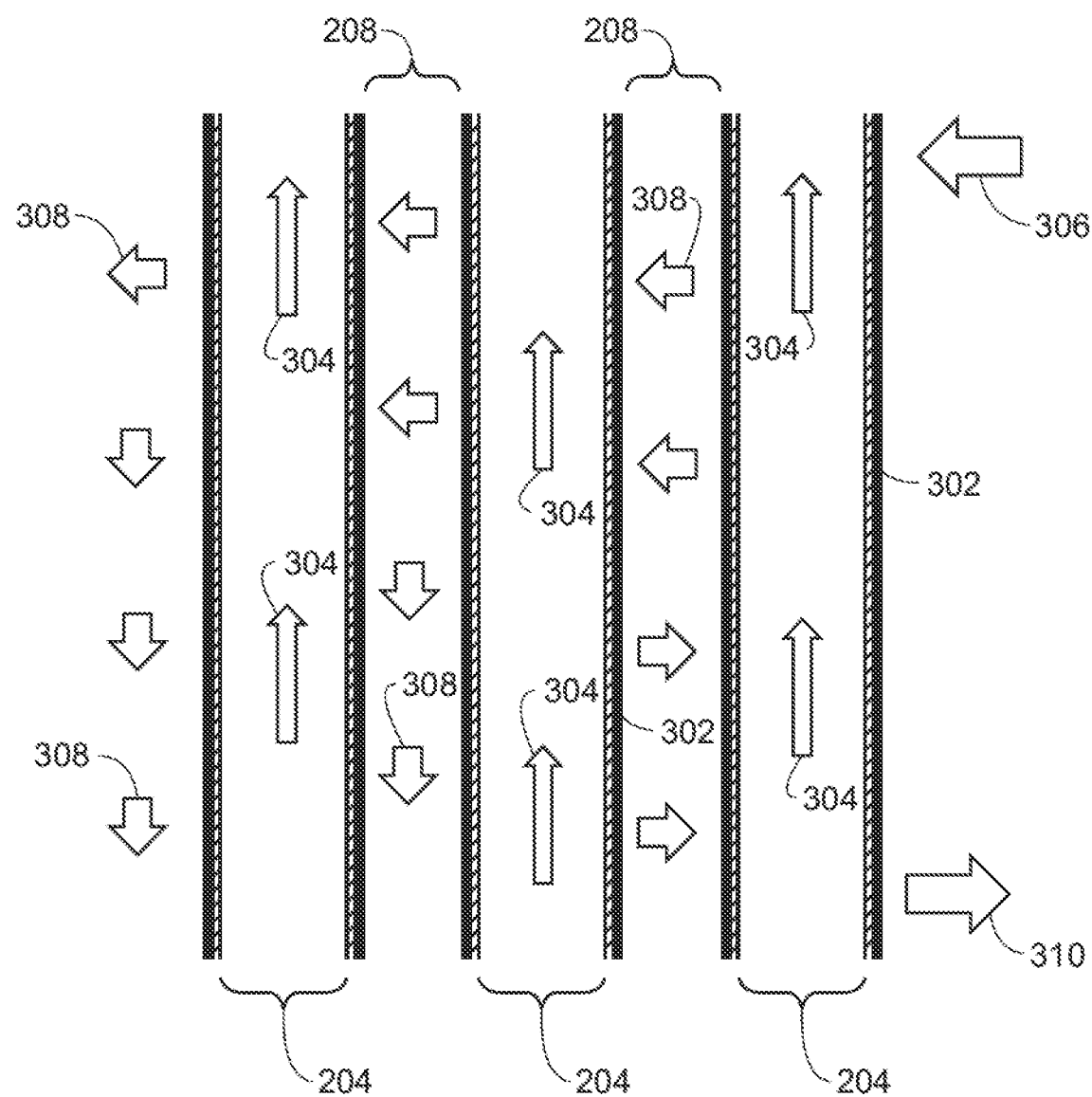
FIG. 3 is a cross-sectional view of the tubes of the reboiler, showing a layer of hydrophobic polymer in contact with the amine solvent.

As described further with respect to FIG. 3, the amine solvent in the tubes 204 is heated to form a two-phase flow that provides the motive force to flow the amine solvent into the top chamber 212 of the reboiler 108. The pressure than forces the amine solvent from the top chamber 212 back to the amine stripper 106 (FIG. 1) through the heated return stream 144.

FIG. 3 is a cross-sectional view of the tubes 204 of the reboiler 108, showing a layer 302 of hydrophobic polymer in contact with the amine solvent 304. Like numbered items are as described with respect to FIGS. 1 and 2. As described with respect to FIG. 2, the amine solvent 304 enters a bottom chamber 202 of the reboiler 108, and flows upwards through the tubes 204. Fresh steam 306 is introduced to the interior of the reboiler 108 and the space 208 around the tubes 204. Circulating steam 308 flows around the tubes 204 transferring heat from the circulating steam 308 to the tubes 204 and the amine solvent 304 flowing through the tubes 204. Outlet steam 310, including condensate and lower temperature steam, then exits the reboiler 108.

Generally, reboilers used with stripper columns are classified as once-through thermosiphon reboilers. The fluid flow upwards of the amine solvent 304 is created by buoyancy forces evolved from a density gradient induced by temperature differences. The density gradient in reboilers is often a combination of two effects, the lower density of hotter fluids and the presence of two-phase flow in the tubes 204 of the reboiler 108 Due to the pumpless nature of flow in thermosiphon reboilers, the fluid circulation, and heat transfer are coupled.

The heat transfer mechanism is quantitatively expressed by the heat transfer coefficient. Equation (1) shows the relationship between heat flux and heat transfer coefficient, where "q" is the heat flux in W/m² (watts per square meter), "h" is the heat transfer coefficient in W/m²-K (watts per square meter per degree kelvin), and "$\Delta T$" is the temperature differential in Kelvin.

$$q = h * \Delta T \quad (1)$$

When the amine solvent 304 enters the two-phase regime, for example, do the boiling of water or gases dissolved in the amine solvent 304, a new heat transfer mechanism occurs to enhance the boiling phenomenon. This mechanism is known as nucleate boiling. Nucleate boiling is enhanced by higher surface temperature, higher surface curvature, or lower energy surface. In operation, only surface temperature can be manipulated to control the degree of boiling.

However, the high surface temperature significantly increases the degradation rate of alkanolamine, because degradation kinetics are exponentially proportional to temperature. Equation (2) shows the rate of diglycolamine degradation products in reboiler tubes, where "$X_o$" is converted mol fraction at the outlet in mol/mol, "$X_i$" is converted mol fraction at the inlet in mol/mol, "$k_T$" is rate constant of the reaction in 1/hr, "$\rho$" is the density of the fluid in kg/m³, "l" is the length of tube in meters, and "G" is the mass flux in kg/m²-hr.

$$X_o = 1 - (1 - X_i) * \exp\left(-k_T * \frac{\rho l}{G}\right) \quad (2)$$

Equation (3) show the pseudo first-order kinetics of alkanolamine thermal degradation. "Ea" is the activation energy in J/mol, "R" is the ideal gas constant in J/mol-K, and "T" is the temperature in Kelvin. Both activation energy and $k_{165°\,C.}$, which is the reaction rate constant at 165° C., were experimentally determined.

$$\ln\left(\frac{k_T}{k_{165°C.}}\right) = \frac{E_a}{R}\left(\frac{1}{(165 + 273.15)} - \frac{1}{T}\right) \quad (A.3)$$

As such, it is preferable to either increase surface curvature or reduce surface energy, e.g., surface tension, to effectively reduce the surface temperature and the degradation rate. A hydrophobic coating reduces surface energy by increasing the degree of contact angle between vapor bubble and surface.

Figure 4:
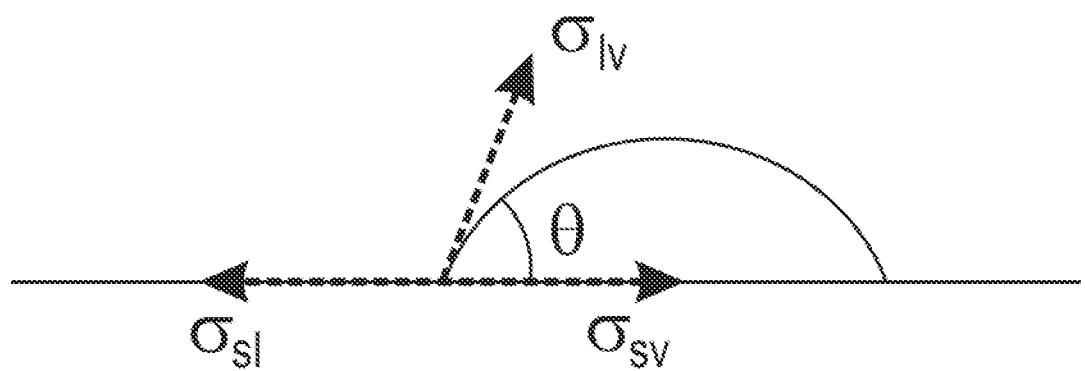
FIG. 4 is drawing showing the effect of surface tension on contact angle.

FIG. 4 is drawing showing the effect of surface tension on contact angle. As described herein, lowering the surface energy, for example, by applying the layer 302 of the hydrophilic polymer, lowers the surface tension. Like numbered items are as described with respect to the previous figures. The flow control of steam to the reboiler 108 is controlled by the overhead temperature of the stripper 106, e.g., the temperature at the top of the stripper 106. Maintaining the overhead temperature is performed by holding the mass flowrate of stripper vapor, for example, from flashing gas in the rich solvent stream 134 entering the stripper 106 and vapor generated in the reboiler 108, to be constant. Accordingly, the flow of steam into the steam shell to hold the heat flux from the steam shell to tube fluid in the reboiler 108 constant. As described in Equation (1), increasing heat transfer coefficient reduces the temperature differential.

Another factor that has been introduced is "Ψ", or the Takata factor, which details the proportionality of heat transfer coefficient with contact angle. This relationship is expressed in Equation (4). The dependence of Takata factor on contact angle is shown in Equation (5), while Young's module shows the contact angle as a function of surface tensions. In these equations, and as shown in FIG. 4, "θ" is the contact angle, "$\sigma_{SV}$" is surface tension between solid surface and vapor, "$\sigma_{Sl}$" is surface tension between solid surface and liquid, and "$\sigma_{lv}$" is surface tension between liquid and vapor.

$$h_2 = h_1 * \frac{\Psi(\theta_2)}{\Psi(\theta_1)} \quad (4)$$

$$\Psi(\theta) = \tan\theta^{1/6} + 0.25 * \tan\theta^{-1/2} \quad (5)$$

$$\cos(\theta) = \frac{\sigma_{sv} - \sigma_{sl}}{\sigma_{lv}} \quad (6)$$

One example of a hydrophobic coating that may be used as layer 302 is Teflon. Correlations have been developed to theoretically calculate surface tensions with stainless steel and Teflon. The contact angles estimated for stainless steel and Teflon substrate were 12.3° and 76.5°, respectively. According to Equations (4) and (5), Teflon coating will enhance heat transfer coefficient by 6 to 8%. This ultimately will reduce the rate of thermal degradation rate of alkanolamine at film and wall positions by 12% and 21%, respectively.

Other hydrophobic polymers may be used as the layer 302, include, for example, ultrahigh molecular weight polyethylene (UHMPE), polyphenylene sulfide (PPS), or polyphenylene oxide (PPO), among many others. In addition to the surface energy of the coating, the ability of the coating to hold up under the high temperatures and chemical environment involved in the reboiler is another factor in choosing the material for the hydrophobic coating. For example, a polymer with a high temperature resistance and resistance to the alkanolamine solvent may provide a better choice than a polymer with a lower surface energy.

Other types of materials may be used as the hydrophobic coating in embodiments. For example, in various embodiments, the hydrophobic coating may be a hydrophobic surface treatment of an interior surface of the tubes 204. Other materials that may be used as hydrophobic coatings may include carbon nanotubes, among others.

Figure 5:
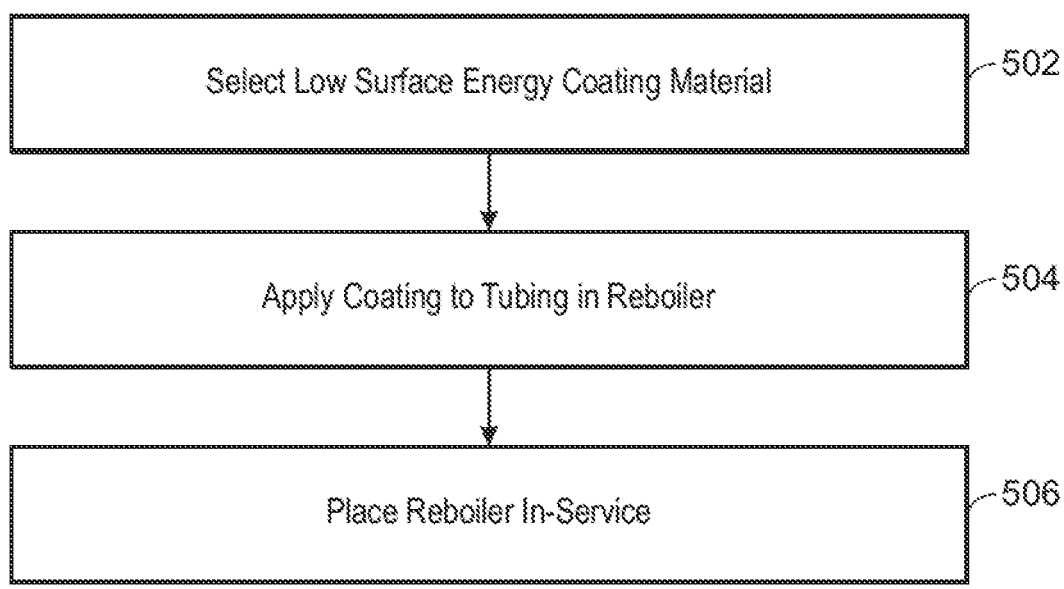
FIG. 5 is a method for making a reboiler that lowers degradation of compounds in contact with the reboiler.

FIG. 5 is a method 500 for making a reboiler that lowers degradation of compounds in contact with the reboiler. The method begins at block 502, with the selection of a low surface-energy coating material. The coating material may be selected as discussed with respect to FIG. 4, for example, to balance temperature resistance, chemical resistance, and low surface energy. In some embodiments, the coating material is a surface treatment to lower the surface energy of the system, such as the application of carbon nanotubes among others.

At block 504, the coating is applied to the tubes in the reboiler. The coating may be applied to the tubes of the reboiler using a powder coating process, after which the coating is melted to the surface of the tubes. In some embodiments, the powder coating is conducted by an electrostatic process. In some embodiments, the coating is applied to the tubes as a solution of a polymer in a solvent. After the coating is applied, the solvent is removed by drying. Other techniques for applying the coating, such as growing carbon nanotubes from the surface of the tubes, may be used. After the tubes are coated, the reboiler may be assembled. In some embodiments, the tube assembly, for example, including the tubes welded to an upper distribution plate and a lower distribution plate, is assembled first, after which the coating is performed.

In addition to the alkanolamine described herein, reboilers used in other types of systems may benefit from the coating described. In these systems, the low surface-energy coating material may be selected to lower the surface energy for other types of chemical systems. In some embodiments, a hydrophilic coating that has a low surface energy to wetting from a hydrocarbon, and is resistant to other organic chemicals, such as hydrocarbons, is selected for reboilers in refineries and chemical plants.

At block 506, the modified reboiler if placed in service in the plant chosen. In some embodiments, this is in an amine stripper, as described herein. In other embodiments, this is in a distillation tower in a refinery or chemical plant.

Embodiments

An exemplary embodiment described herein provides a reboiler that includes a steam shell and a plurality of tubes. The reboiler includes a low surface-energy coating on a surface of the plurality of tubes.

In an aspect, the reboiler includes a once-through thermosiphon design.

In an aspect, the reboiler includes a steam inlet to the steam shell, and a steam outlet from the steam shell. The steam inlet is disposed at the top of the steam shell and the steam outlet is disposed at the bottom of the steam shell.

In an aspect, the reboiler includes an organic compound flowing upwards through the plurality of tubes. In an aspect, the organic compound includes alkanolamine. In an aspect, the low surface-energy coating is on the surface of the plurality of tubes that is in contact with the organic compound.

In an aspect, the low surface-energy coating includes a hydrophobic polymer. In an aspect, the hydrophobic polymer includes polytetrafluoroethylene. In an aspect, the hydrophobic polymer includes polyphenylene oxide, polyphenylene sulfide, or ultrahigh molecular weight polyethylene, or any combinations thereof. In an aspect, the low surface-energy coating includes carbon nanotubes. In an aspect, the low surface-energy coating includes a texturing of the surface.

In an aspect, the reboiler includes an alkanolamine inlet coupled to an amine stripper, and an alkanolamine outlet coupled to the amine stripper.

Another exemplary embodiment described herein provides a method for controlling degradation of a compound in a reboiler. The method includes selecting a low surface-energy coating, applying the low surface-energy coating to a surface of a tube in the reboiler that is in contact with the compound, and placing the reboiler in service.

In an aspect, the low surface-energy coating is selected by the surface energy to be hydrophobic. In an aspect, the low surface-energy coating is selected by resistance to the compound in contact with the low surface-energy coating. In an aspect, the low surface-energy coating is selected by resistance to an operating temperature of the reboiler.

In an aspect, the low surface-energy coating is applied to the surface of the tube as a powder coating, which is then fused onto the surface of the tube. In an aspect, the low surface-energy coating is sprayed onto the surface of the tube in a solution, and a solvent in the solution is then evaporated.

In an aspect, the reboiler is placed into service by being fluidically coupled to an amine stripper. In an aspect, the reboiler is placed into service by being fluidically coupled to a distillation column in a refinery or chemical plant.

Another exemplary embodiment described herein provides an amine stripper. The amine stripper includes a vessel including a rich solvent inlet and a lean solvent outlet, and a reboiler. The reboiler includes a steam shell, a plurality of tubes, and a low surface-energy coating on a surface of the plurality of tubes.

In an aspect, the amine stripper includes a reflux chiller, wherein the reflux chiller is configured to provide a reflux flow back to the vessel. In an aspect, the amine stripper includes a fluidic coupling above a plate in the amine stripper to an inlet at the bottom of the reboiler, and a fluidic coupling from an outlet at the top of the reboiler to the amine stripper below the plate.

In an aspect, the amine stripper includes the low surface-energy coating on the surface of the plurality of tubes that is in contact with the solvent. In an aspect, the solvent includes alkanolamine.

Other implementations are also within the scope of the following claims.

What is claimed is:

1. A reboiler, comprising:
a steam shell;
a plurality of tubes with steam disposed on one side of the plurality of tubes and an organic compound disposed on the opposite side of the plurality of tubes; and
a low surface-energy coating on a surface of the plurality of tubes in contact with the organic compound.

2. The reboiler of claim 1, comprising:
a steam inlet to the steam shell; and
a steam outlet from the steam shell, wherein the steam inlet is disposed at the top of the steam shell and the steam outlet is disposed at the bottom of the steam shell.

3. The reboiler of claim 1, comprising an organic compound flowing upwards through the plurality of tubes.

4. The reboiler of claim 3, wherein the organic compound comprises alkanolamine.

5. The reboiler of claim 3, comprising the low surface-energy coating on the surface of the plurality of tubes that is in contact with the organic compound.

6. The reboiler of claim 1, wherein the low surface-energy coating comprises a hydrophobic polymer.

7. The reboiler of claim 6, wherein the hydrophobic polymer comprises polytetrafluoroethylene.

8. The reboiler of claim 6, wherein the hydrophobic polymer comprises polyphenylene oxide, polyphenylene sulfide, or ultrahigh molecular weight polyethylene, or any combinations thereof.

9. The reboiler of claim 1, wherein the low surface-energy coating comprises carbon nanotubes.

10. The reboiler of claim 1, wherein the low surface-energy coating comprises a texturing of the surface.

11. The reboiler of claim 1, comprising:
an alkanolamine inlet coupled to an amine stripper; and
an alkanolamine outlet coupled to the amine stripper.

12. An amine stripper, comprising:
a vessel comprising a rich solvent inlet and a lean solvent outlet; and
a plurality of tubes with steam disposed on one side of the plurality of tubes and a solvent disposed on the opposite side of the plurality of tubes; and
a low surface-energy coating on a surface of the plurality of tubes in contact with the solvent.

13. The amine stripper of claim 12, comprising a reflux chiller, wherein the reflux chiller is configured to provide a reflux flow back to the vessel.

14. The amine stripper of claim 12, comprising a fluidic coupling above a plate in the amine stripper to an inlet at the bottom of the reboiler, and a fluidic coupling from an outlet at the top of the reboiler to the amine stripper below the plate.

15. The amine stripper of claim 12, comprising the low surface-energy coating on the surface of the plurality of tubes that is in contact with the solvent.

16. The amine stripper of claim 12, wherein the solvent comprises alkanolamine.

* * * * *

UNITED STATES PATENT AND TRADEMARK OFFICE
CERTIFICATE OF CORRECTION

| | |
|---|---|
| PATENT NO. | : 11,524,249 B2 |
| APPLICATION NO. | : 17/194553 |
| DATED | : December 13, 2022 |
| INVENTOR(S) | : Hasan M. AlShafei |

It is certified that error appears in the above-identified patent and that said Letters Patent is hereby corrected as shown below:

On the Title Page

Under item (56), Other Publications, Column 2, Lines 1-2, please replace "Gorwing Disposal" with -- Growing Disposal --.

Signed and Sealed this
Eleventh Day of April, 2023

*Katherine Kelly Vidal*

Katherine Kelly Vidal
*Director of the United States Patent and Trademark Office*